US010268682B2

(12) United States Patent
Chakra et al.

(10) Patent No.: US 10,268,682 B2
(45) Date of Patent: *Apr. 23, 2019

(54) ADJUSTING TEXT IN MESSAGE IN LIGHT OF RECIPIENTS INTERESTS AND/OR PERSONALITY TRAITS TO SUSTAIN RECIPIENT'S INTEREST IN MESSAGE

(71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/243,726

(22) Filed: Apr. 2, 2014

(65) Prior Publication Data

US 2015/0286617 A1  Oct. 8, 2015

(51) Int. Cl.
  *G06F 17/27* (2006.01)
  *G06F 17/28* (2006.01)
(52) U.S. Cl.
  CPC .......... *G06F 17/28* (2013.01); *G06F 17/274* (2013.01); *G06F 17/2881* (2013.01)
(58) Field of Classification Search
  CPC ................................................ G06F 17/30648
  USPC ............................................................ 704/9
  See application file for complete search history.

(56) References Cited

U.S. PATENT DOCUMENTS

| 8,296,376 | B2 | 10/2012 | Goldberg et al. |
| 2006/0048053 | A1 | 3/2006 | Sembower et al. |
| 2006/0184418 | A1 | 8/2006 | Connolly et al. |
| 2008/0243608 | A1 | 10/2008 | Chatow et al. |
| 2009/0100047 | A1* | 4/2009 | Jones ................ G06F 17/30648 |

(Continued)

OTHER PUBLICATIONS

Nathalie Southall, "Using Text Mining for Frame Analysis of Media Content," http://www.jisc.ac.uk/whatwedo/programmes/einfrastructure/assisttmfa.aspx, May 3, 2013, pp. 1-6.

(Continued)

*Primary Examiner* — Jakieda R Jackson
(74) *Attorney, Agent, or Firm* — Robert A. Voigt, Jr.; Winstead, P.C.

(57) ABSTRACT

A method, system and computer program product for adjusting text in a message to sustain the recipient's interest in the message. Upon identifying the recipients to receive a message, information, including interests and/or personality traits, regarding the identified recipients is retrieved. Upon obtaining the recipient's interests and/or personality traits, a linguistic engine is utilized to generate words and phrases (e.g., speed, parking, license, toll) associated with the recipient's interest and/or personality trait (e.g., interest in cars). The words and ordering of the words in the message are then changed to include words and phrases associated with the interest and/or personality trait of the recipient. In this manner, the author is able to compose a message that sustains the recipient's interest in the message by modifying the message to include language directed to the recipient's interests (e.g., traveling, collecting baseball cards) and/or personality traits (e.g., hates loud music).

20 Claims, 6 Drawing Sheets

(56) References Cited

U.S. PATENT DOCUMENTS

| | | | |
|---|---|---|---|
| 2009/0327054 A1* | 12/2009 | Yao | G06Q 30/02 705/12 |
| 2010/0119053 A1* | 5/2010 | Goeldi | G06Q 10/00 379/265.09 |
| 2010/0138402 A1* | 6/2010 | Burroughs | G06F 17/30684 707/706 |
| 2010/0217525 A1* | 8/2010 | King | G06Q 30/02 701/300 |
| 2010/0223341 A1 | 9/2010 | Manolescu et al. | |
| 2013/0073336 A1* | 3/2013 | Heath | G06Q 30/02 705/7.29 |
| 2014/0026083 A1* | 1/2014 | Waisbein | G06F 17/30864 715/763 |
| 2014/0359480 A1* | 12/2014 | Vellal | H04L 51/16 715/752 |
| 2015/0046357 A1* | 2/2015 | Danson | G06Q 10/1053 705/321 |

OTHER PUBLICATIONS

List of IBM Patents or Patent Applications Treated as Related, 2015, pp. 1-2.
Office Action for U.S. Appl. No. 14/608,407 dated Aug. 26, 2015, pp. 1-17.
Office Action for U.S. Appl. No. 14/608,407 dated Jul. 11, 2018, pp. 1-7.
Office Action for U.S. Appl. No. 14/608,407 dated Jan. 4, 2016, pp. 1-15.

* cited by examiner

ADJUSTING TEXT IN MESSAGE IN LIGHT OF RECIPIENTS INTERESTS AND/OR PERSONALITY TRAITS TO SUSTAIN RECIPIENT'S INTEREST IN MESSAGE

TECHNICAL FIELD

The present invention relates generally to communications, and more particularly to adjusting the text in a message in light of the recipient's interests and/or personality traits to sustain the recipient's interest in the message.

BACKGROUND

There are various forms of communication between users of a computing device, such as via electronic mail ("e-mail"), social media (e.g., social networking sites), text messaging, etc. Messages, including documents (e.g., word processing document), that are composed and distributed to recipients in such a manner may include text that loses the interest of the recipient in reading the message. For example, the recipient may receive a message regarding the current policies and guidelines of the recipient's employer. Such a message may include text that loses the interest of the recipient thereby preventing the recipient from reading the entirety of the message and not acquiring the needed information.

Furthermore, with ever increasing amounts of messages to review, it is becoming more important to compose messages that maintain the interest of the recipient since the recipient has less time to read each message. The problem with composing messages to maintain the interest of a recipient may be even more difficult in cases where the message is being sent to disparate recipients in a mass mailing, where each recipient may lose interest in reading the message in different ways.

Currently, there is not a means for assisting the author in composing a message to sustain the recipient's interest in the message.

BRIEF SUMMARY

In one embodiment of the present invention, a method for adjusting text in a message to sustain recipient's interest in the message comprises receiving a message for one or more recipients. The method further comprises identifying the one or more recipients to receive the message. Furthermore, the method comprises retrieving information regarding the identified one or more recipients, where the information comprises interests and/or personality traits of the identified one or more recipients. Additionally, the method comprises utilizing a linguistic engine to generate words and phrases associated with an interest and/or personality trait of a first recipient of the identified one or more recipients. In addition, the method comprises utilizing, by a processor, natural language processing to change words and ordering of words in the message to include words and phrases associated with the interest and/or personality trait of the first recipient of the identified one or more recipients.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for adjusting text in a message to sustain the recipient's interest in the message. In one embodiment of the present invention, the recipients to receive a message are identified. A "message," as used herein, refers to any type of communication between computers, including, but not limited, e-mail, instant messages, text messages, documents (e.g., word processing documents), posts to social media websites, such as Facebook®, forums, wikis, etc. Upon identifying the recipients, information, including interests and/or personality traits, regarding the identified recipients is retrieved. For example, interests and/or personality traits may be obtained by focusing on keywords, such as "travel," "sports," "dislike," when analyzing the recipient's company profile page and/or the recipient's home page on social media websites (e.g., LinkedIn®, Facebook®) using natural language processing. Upon obtaining the recipient's interests and/or personality traits, a linguistic engine is utilized to generate words and phrases associated with the recipient's interests and/or personality traits. For example, if the recipient has an interest in cars, then words, such as speed, limit, sign, license, toll and parking may be generated to be possibly used in the message to sustain the recipient's interest in the message. The words and ordering of the words in the message are then changed to include words and phrases associated with the interest and/or personality trait of the recipient by utilizing natural language processing. In this manner, the author is able to compose a message that sustains the recipient's interest in the message by modifying the message (e.g., changing the words and ordering of the words) to include language directed to the recipient's interests (e.g., traveling, collecting baseball cards, cars) and/or personality traits (e.g., hates loud music).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
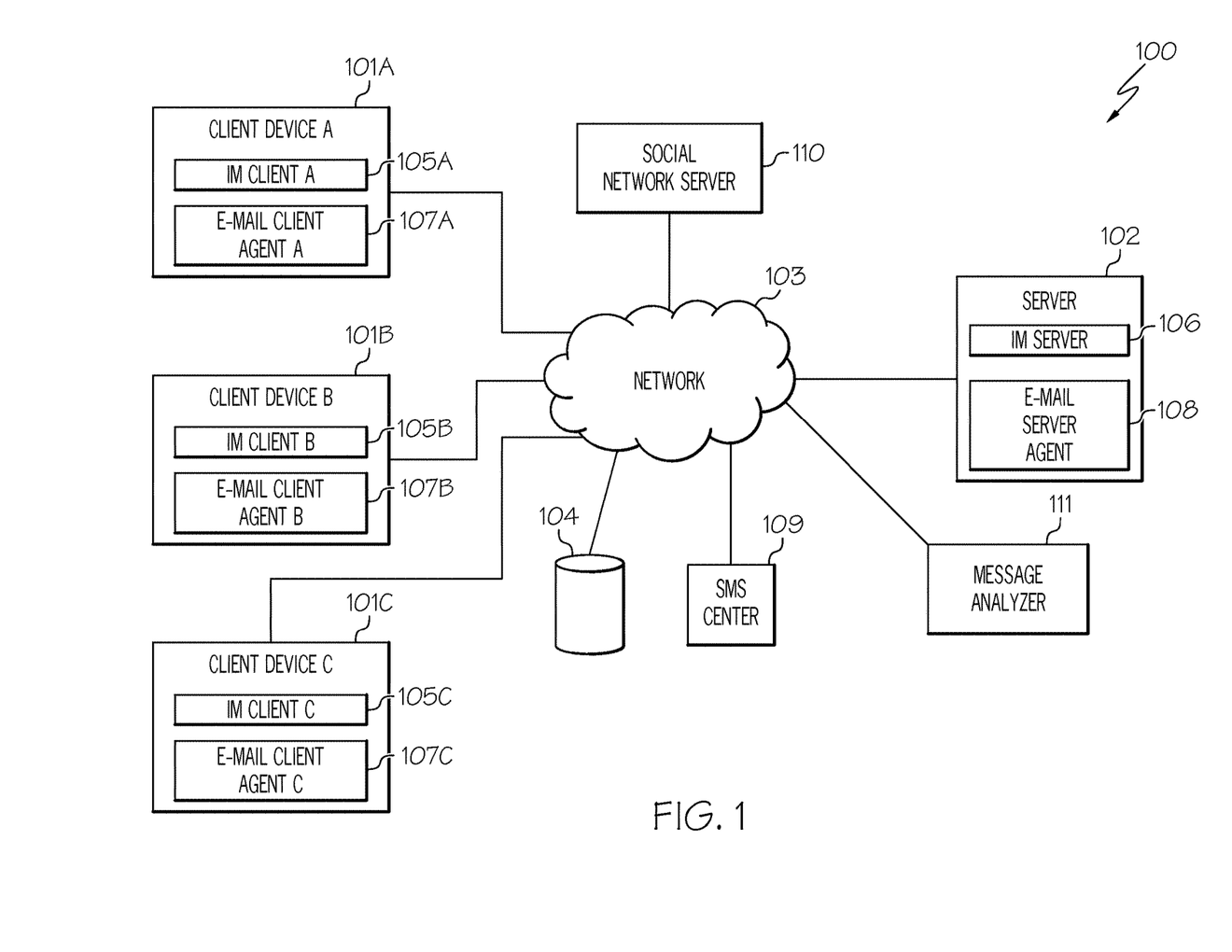
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. Client device 101 may be configured to send and receive text-based messages in real-time during an instant messaging session. Any user of client device 101 may be the creator or initiator of an instant message (message in instant messaging) and any user of client device 101 may be a recipient of an instant message. Furthermore, any user of client device 101 may be able to create, receive and send e-mails. Additionally, any user of client device 101 may be able to send and receive text messages, such as Short Message Services (SMS) messages. Furthermore, any user of client device 101 may be able to send documents (e.g., word processing documents), such as those stored in database 104 connected to network 103, to other client devices 101. The term "messages," as used herein, encompasses each of these types of messages, including documents (e.g., word processing documents) as well as posts to social media websites, such as Facebook®, forums, wikis, etc.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, client devices 101A-101C include a software agent, referred to herein as an Instant Messaging (IM) client 105A-105C, respectively. Instant messaging clients 105A-105C may collectively or individually be referred to as instant messaging clients 105 or instant messaging client 105, respectively. Furthermore, server 102 includes a software agent, referred to herein as the Instant Messaging (IM) server 106. IM client 105 provides the functionality to send and receive instant messages. As messages are received, IM client 105 presents the messages to the user in a dialog window (or IM window). Furthermore, IM client 105 provides the functionality for client device 101 to connect to the IM server 106 which provides the functionality of distributing the instant messages to the IM clients 105 associated with each of the sharing users.

Client devices 101A-101C may further include a software agent, referred to herein as an e-mail client agent 107A-107C, respectively. E-mail client agents 107A-107C may collectively or individually be referred to as e-mail client agents 107 or e-mail client agent 107, respectively. Furthermore, server 102 may include a software agent, referred to herein as the e-mail server agent 108. E-mail client agent 107 enables the user of client device 101 to create, send and receive e-mails. E-mail server agent 108 is configured to receive e-mail messages from client devices 101 and distribute the received e-mail messages among the one or more client devices 101.

While the preceding discusses each client device 101 as including an IM client 105 and an e-mail client agent 107, each client device 101 may not necessarily include each of these software agents. For example, some client devices 101 may only include an IM client 105; whereas, other client devices 101 may only include an e-mail client agent 107. In other words, each client device 101 may be able to perform some or all of the functions discussed herein, such as sending/receiving e-mails, sending/receiving instant messages, sending/receiving text messages, etc. Furthermore, while the preceding discusses a single server 102 including the software agents, such as IM server 106 and e-mail server agent 108, multiple servers may be used to implement these services. Furthermore, each server 102 may not necessarily be configured to include all of these software agents, but only a subset of these software agents. For example, one particular server 102 may only include IM server 106; whereas, another particular server 102 may only include e-mail server agent 108.

System 100 further includes a Short Message Service (SMC) center 109 configured to relay, store and forward text messages, such as SMS messages, among client devices 101 through network 103.

System 100 further includes a social network server 110, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 110 is connected to network 103 by wire or wirelessly. While FIG. 1 illustrates a single social network server 110, it is noted for clarity that multiple servers may be used to implement the social networking and/or microblogging service.

System 100 further includes a component, referred to herein as the "message analyzer" 111, connected to network 103 by wire or wirelessly. Message analyzer 111 is configured to assist authors in composing messages that will sustain the interest of the recipients by incorporating language directed to the recipient's interests and/or personality traits as discussed further below in connection with FIGS. 3A-3B and 4-6. In one embodiment, the recipient's interests and/or personality traits may be stored in a database, such as database 104. While the foregoing description discusses database 104 storing documents, such as word processing documents, database 104, including an additional separate database 104, may be configured to store the recipient's interests and/or personality traits. Database 104, including an additional separate database 104, may further be configured to store words and/or phrases associated with interests and/or personality traits. A description of the hardware configuration of message analyzer 111 is provided below in connection with FIG. 2.

System 100 is not to be limited in scope to any one particular network architecture. System 100 may include any number of client devices 101, servers 102, networks 103, databases 104, SMS centers 109, social network servers 110 and message analyzers 111.

Figure 2:
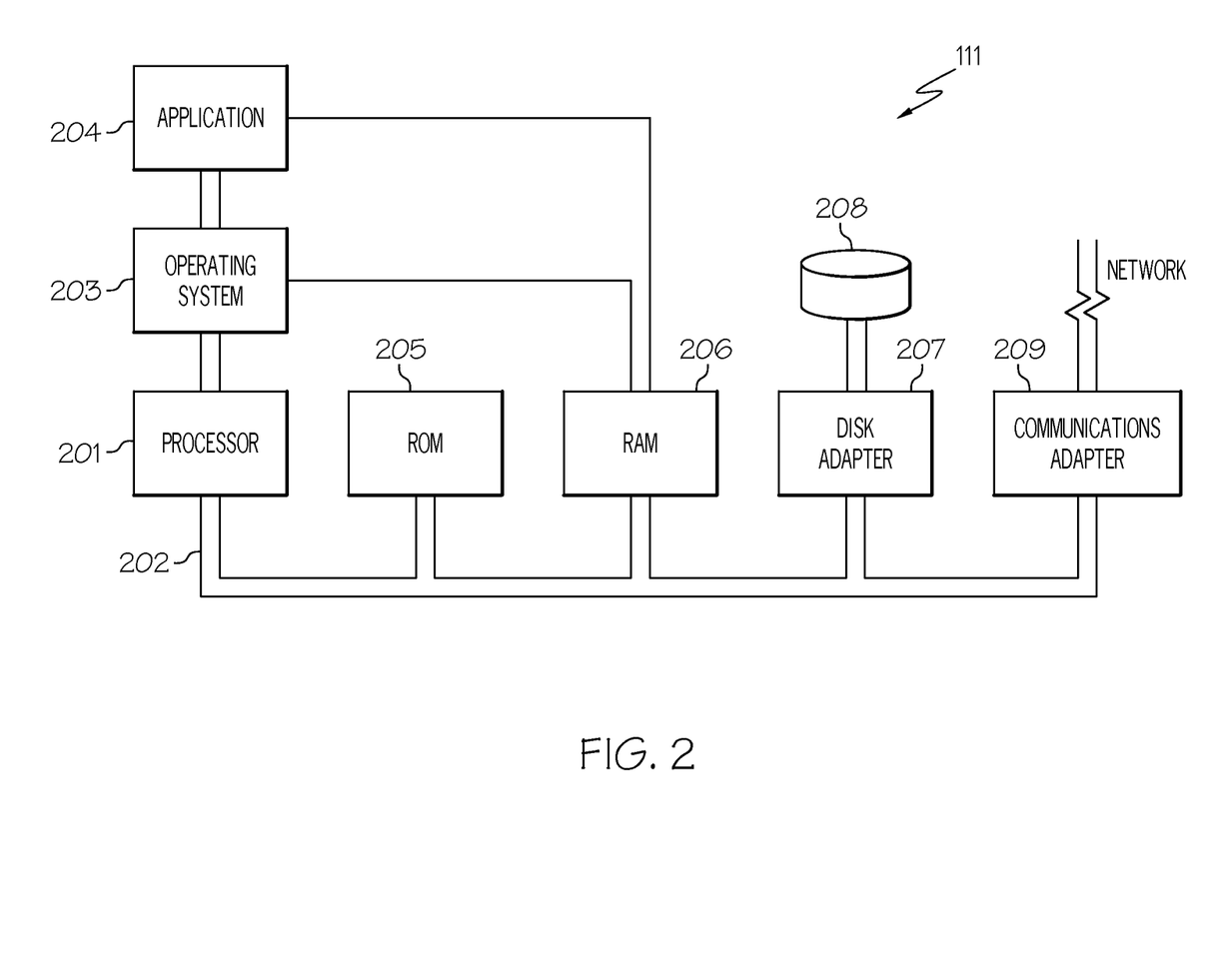
FIG. 2 illustrates a hardware configuration of a message analyzer in accordance with an embodiment of the present invention.

Referring now to FIG. 2, FIG. 2 illustrates a hardware configuration of message analyzer 111 (FIG. 1) which is representative of a hardware environment for practicing the present invention. Referring to FIG. 2, message analyzer 111 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for assisting authors in composing messages that will sustain the interest of the recipients as discussed further below in association with FIGS. 3A-3B and 4-6.

Referring again to FIG. 2, read-only memory ("ROM") 205 is coupled to system bus 202 and includes a basic input/output system ("BIOS") that controls certain basic functions of message analyzer 111. Random access memory ("RAM") 206 and disk adapter 207 are also coupled to system bus 202. It should be noted that software components including operating system 203 and application 204 may be loaded into RAM 206, which may be message analyzer's 111 main memory for execution. Disk adapter 207 may be an integrated drive electronics ("IDE") adapter that communicates with a disk unit 208, e.g., disk drive. It is noted that the program for assisting authors in composing messages that will sustain the interest of the recipients, as discussed further below in association with FIGS. 3A-3B and 4-6, may reside in disk unit 208 or in application 204.

Message analyzer 111 may further include a communications adapter 209 coupled to bus 202. Communications adapter 209 interconnects bus 202 with an outside network (network 103 of FIG. 1) thereby enabling message analyzer 111 to communicate with client devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are various forms of communication between users of a computing device, such as via electronic mail ("e-mail"), social media (e.g., social networking sites), text messaging, etc. Messages, including documents (e.g., word processing document), that are composed and distributed to recipients in such a manner may include text that loses the interest of the recipient in reading the message. For example, the recipient may receive a message regarding the current policies and guidelines of the recipient's employer. Such a message may include text that loses the interest of the recipient thereby preventing the recipient from reading the entirety of the message and not acquiring the needed information. Furthermore, with ever increasing amounts of messages to review, it is becoming more important to compose messages that maintain the interest of the recipient since the recipient has less time to read each message. The problem with composing messages to maintain the interest of a recipient may be even more difficult in cases where the message is being sent to disparate recipients in a mass mailing, where each recipient may lose interest in reading the message in different ways. Currently, there is not a means for assisting the author in composing a message to sustain the recipient's interest in the message.

Figure 3A:
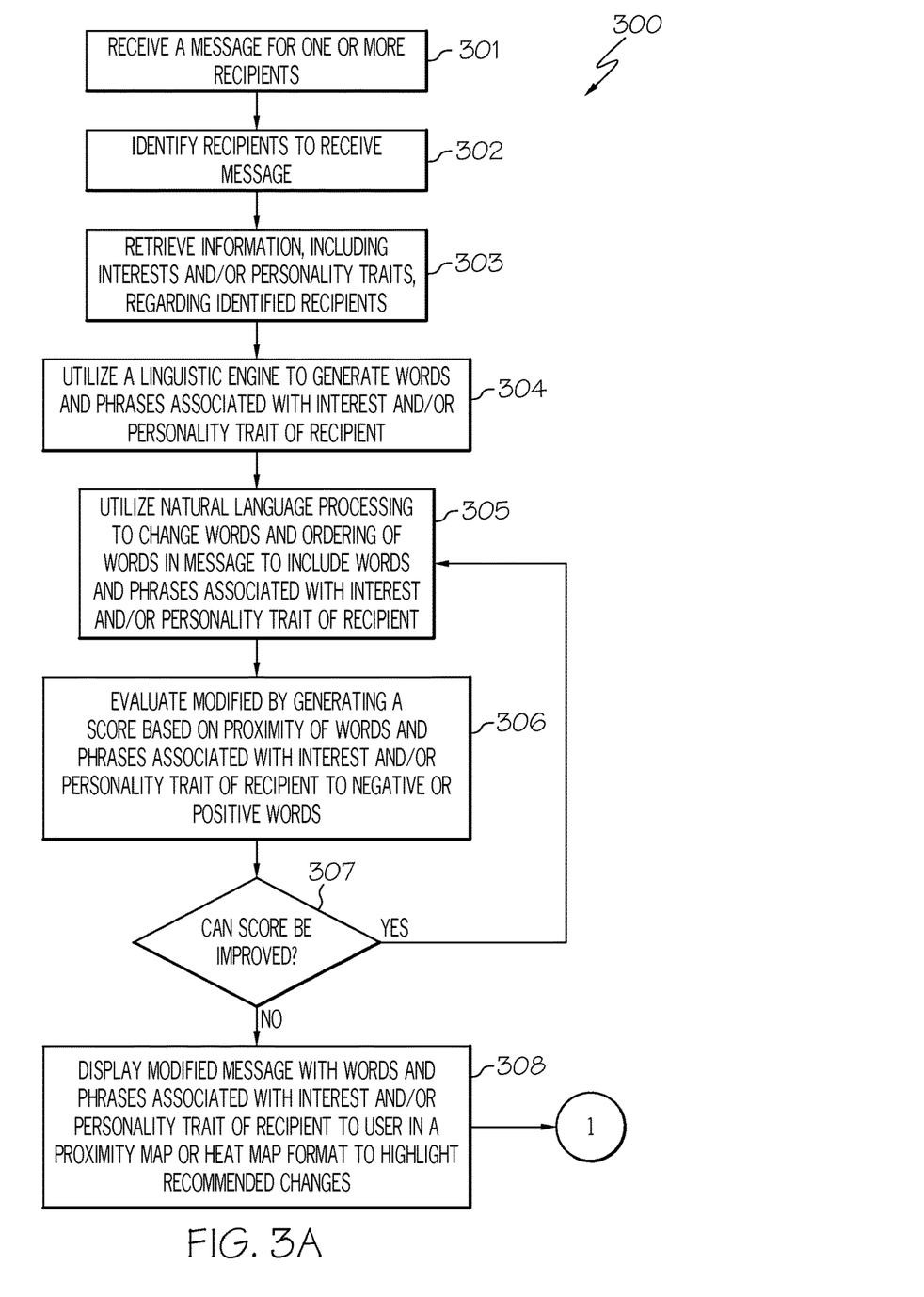
FIGS. 3A-3B are a flowchart of a method for assisting the author in composing a message to sustain the recipient's interest in the message in accordance with an embodiment of the present invention.
Figure 3B:
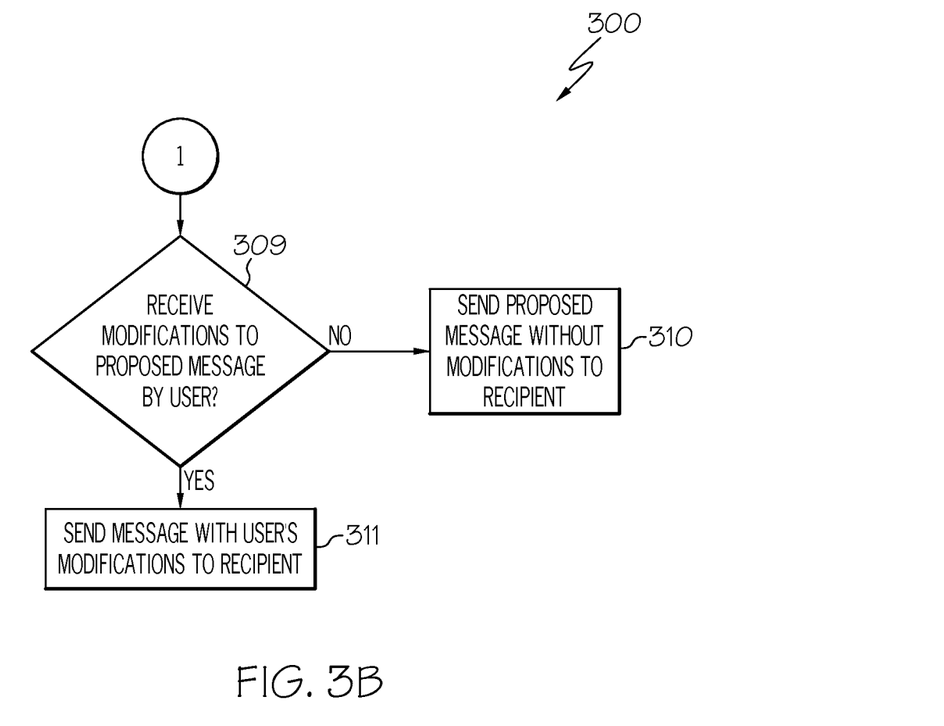
Figure 4:
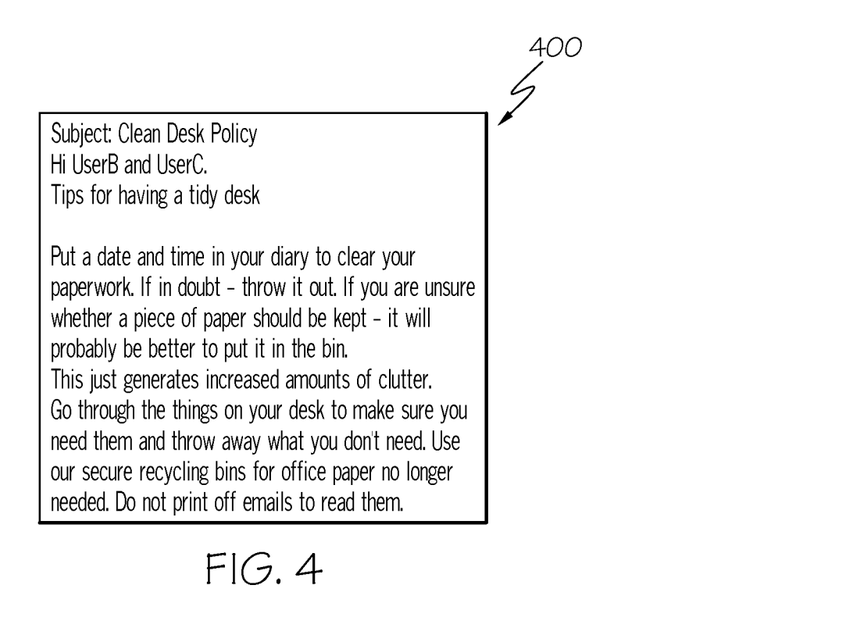
FIG. 4 illustrates a message composed by an author prior to being modified to sustain the recipient's interest in accordance with an embodiment of the present invention.
Figure 5:
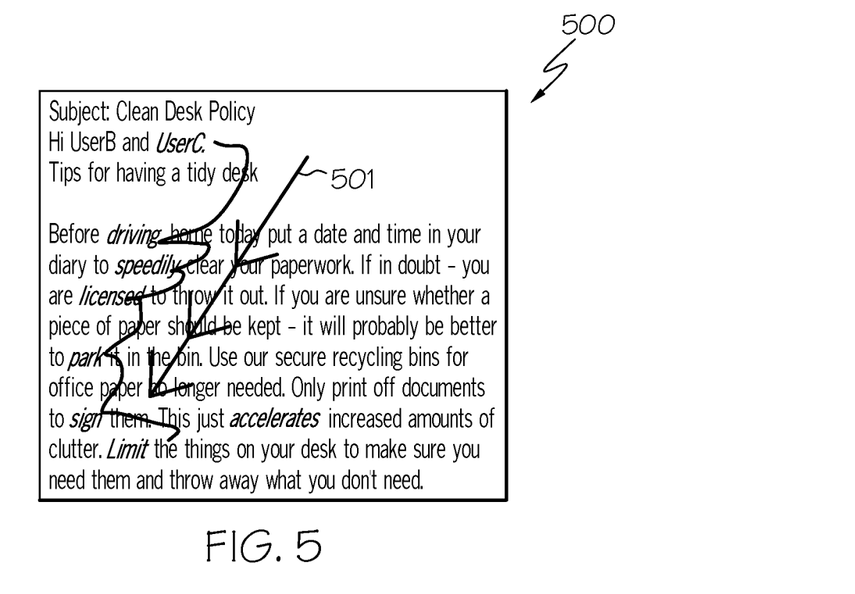
FIG. 5 illustrates the message of FIG. 4 being modified by including language directed to the recipient's interests and/or personality traits to sustain the recipient's interest in the message in accordance with an embodiment of the present invention.
Figure 6:
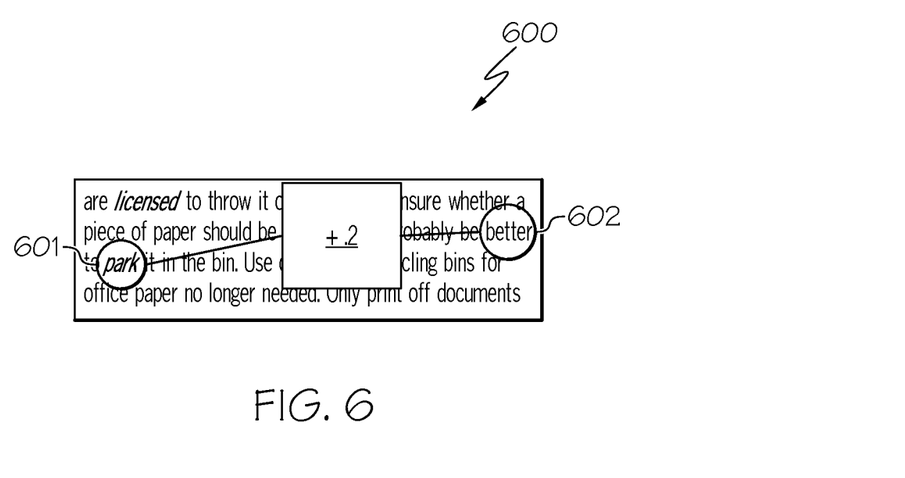
FIG. 6 illustrates generating a score based on the proximity of the word or phrase associated with an interest and/or personality trait of the recipient to a positive or negative term in accordance with an embodiment of the present invention.

The principles of the present invention provide a means for allowing the author to compose a message that sustains the recipient's interest in the message by modifying the message (e.g., changing the words and ordering of the words) to include language directed to the recipient's interests (e.g., traveling, collecting baseball cards, cars) and/or personality traits (e.g., hates loud music) as discussed further below in connection with FIGS. 3A-3B and 4-6. FIGS. 3A-3B are a flowchart of a method for assisting the author in composing a message to sustain the recipient's interest in the message. FIG. 4 illustrates a message composed by an author prior to being modified to sustain the recipient's interest. FIG. 5 illustrates the message of FIG. 4 being modified by including language directed to the recipient's interests and/or personality traits to sustain the recipient's interest in the message. FIG. 6 illustrates generating a score based on the proximity of the word or phrase associated with an interest and/or personality trait of the recipient to a positive or negative term.

As stated above, FIGS. 3A-3B are a flowchart of a method 300 for assisting the author in composing a message to sustain the recipient's interest in the message in accordance with an embodiment of the present invention.

Referring to FIG. 3A, in conjunction with FIGS. 1-2, in step 301, message analyzer 111 receives a message for one or more recipients (e.g., user of client device 101B, user of client device 101C). "Message," as used herein, refers to any type of communication between computers, including, but not limited, e-mail, instant messages, text messages, documents (e.g., word processing documents), posts to social media websites, such as Facebook®, forums, wikis, etc.

In step 302, message analyzer 111 identifies the recipients to receive the message. In one embodiment, message analyzer 111 determines the recipients to receive the message by identifying the recipients following the "TO:" field or keywords (e.g., "Hi!") in the message. In another embodiment, the author composing the message informs message analyzer 111 who are the recipients to receive the composed message.

In step 303, message analyzer 111 retrieves information, including interests and/or personality traits, regarding the identified recipients. In one embodiment, interests and/or personality traits are obtained from the recipient's company profile pages using natural language processing. In another embodiment, interests and/or personality traits are obtained from social media websites, such as LinkedIn® and Facebook®, using natural language processing. For example, message analyzer 111 may identify interests and/or personality traits by focusing on keywords, such as "travel," "sports," "dislike," when analyzing the recipient's company profile page and/or the recipient's home page on social media websites (e.g., LinkedIn®, Facebook®) using natural language processing. Such interests and/or personality traits that are discovered may be stored in a database (e.g., database 104) which may be retrieved by message analyzer 111. While the foregoing description discusses obtaining the recipient's interests and/or personality traits from the sources of the recipient's company profile pages and the recipient's home page on social media websites, the principles of the present invention are to include other public sources where information regarding the recipient's interests and/or personality traits may be obtained.

As discussed below in connection with steps 304-311, upon obtaining the recipient's interests and/or personality traits, message analyzer 111 will modify the message to include language directed to the recipient's interest and/or personality trait so as to sustain the recipient's interest in reading the message. The following discussion of steps 304-311 of method 300 occurs for each recipient identified in step 302.

In step 304, message analyzer 111 utilizes a linguistic engine to generate words and phrases associated with the recipient's interest and/or personality trait. For example, if the recipient has an interest in cars, then words, such as speed, limit, sign, license, toll and parking may be generated to be possibly used in the message to sustain the recipient's interest in the message. In one embodiment, the linguistic engine utilizes a database (e.g., database 104) of words and/or phrases associated with interests and/or personality traits.

In step 305, message analyzer 111 utilizes natural language processing to change words and ordering of words in the message to include words and phrases associated with an interest and/or personality trait of the recipient. Modification of the message by changing words and ordering of words may involve one of the following: adjusting the paragraph layouts/margins, scaling or moving the paragraphs/sentences, replacing parts of speech (e.g., noun, verb, adjective, adverb) with a synonym which has a more positive/negative tone, etc. The goal of the modification to the message is to capture the recipient's interest in reading the message by incorporating language directed to the recipient's interests and/or personality traits as illustrated in FIGS. 4 and 5.

FIG. 4 illustrates a message 400 composed by an author (e.g., user of client device 101A) prior to being modified to sustain the recipient's interest in accordance with an embodiment of the present invention.

Referring to FIG. 4, message 400 is a message directed to user B (e.g., user of client device 101B) and user C (e.g., user of client device 101C) regarding the policy of maintaining a clean desk. Such a message may include language to cause these recipients to lose interest in reading the message. As discussed above, message analyzer 111 identifies the recipients, such as by identifying the recipients following the use of the keyword "Hi" in the message. Message analyzer 111 then retrieves the interests and/or personality traits for these recipients. For example, suppose that user C has an interest in cars. As a result, message analyzer 111 generates words and phrases associated with such an interest (e.g., speed, limit, sign, license, toll and parking) and modifies the message, such as by changing the words and ordering of the words, to include words and phrases associated with such an interest as illustrated in FIG. 5.

FIG. 5 illustrates modifying message 400 of FIG. 4 (modified message 500) to be sent to user C by including language directed to user C's interests and/or personality traits (e.g., interest in cars) to sustain user C's interest in the message in accordance with an embodiment of the present invention. FIG. 5 illustrates presenting modified message 500 in a proximity map format.

Referring to FIG. 5, modified message 500 to be sent to user C now includes language directed to user C's interest in cars as illustrated with the highlighted terms (shown in bold and italicized) pertaining to cars, such as "driving," "speedily," "licensed," "park," "sign," "accelerates," and "limit." Also, as illustrated in FIG. 5, these "eye catching words" are all in a line so that the reader is more likely to jump from one line to the next thereby maintaining interest in the whole message as illustrated by arrow 501. Such a depiction is referred to herein as a "proximity map format." Message analyzer 111 may also display the changes to the message in a heat map format where negative/positive connotations from the recommended changed words and phrases can be illustrated.

Returning to FIG. 3A, in conjunction with FIGS. 1-2 and 4-5, in step 306, message analyzer 111 evaluates the modified message (message of step 305) by generating a score based on the proximity of the words and phrases associated with the interest and/or personality trait of the recipient to negative or positive words as illustrated in FIG. 6. FIG. 6 illustrates generating a score based on the proximity of the word or phrase associated with an interest and/or personality trait of the recipient to a positive or negative term in accordance with an embodiment of the present invention.

Referring to FIG. 6, in the phrase "it will be probably be better to park it in the bin" in modified message 500 of FIG. 5, the term "park" 601 associated with an interest (e.g., cars) of the recipient (e.g., user C) is assigned a score of +0.2 based on its proximity to the positive term "better" 602. For example, in one embodiment, a positive word 1 cm in any direction from a word/phrase associated with a recipient's interest and/or personality trait is assigned a +1 score. A negative word 1 cm from a word/phrase associated with a recipient's interest and/or personality trait is assigned a −1 score. As the distance change so does the score as illustrated in FIG. 6. The closer the positive/negative word to the word/phrase associated with a recipient's interest and/or personality trait, the greater/lesser the value of the score, respectively.

This technique as illustrated in FIG. 6 is performed for every word and phrase associated with the recipient's interest and/or personality trait in modified message 500 and a total score is calculated in step 306.

Returning to FIG. 3A, in conjunction with FIGS. 1-2 and 4-6, in step 307, a determination is made by message analyzer 111 as to whether the score (the total score calculated) can be improved.

If the score can be improved, then message analyzer 111 utilizes natural language processing to further change the words and ordering of words in the message to include different words and phrases associated with an interest and/or personality trait of the recipient in step 305.

If, however, the score cannot be improved, then, in step 308, message analyzer 111 displays the modified message (e.g., modified message 500) with words and phrases associated with the interest and/or personality trait of the recipient to the user (author of message) in a proximity map (as shown in FIG. 5) or heat map format to highlight the recommended changes. In one embodiment, the user is provided the opportunity to accept/reject these recommended changes as well as to modify the text of the modified message as discussed below.

Referring now to FIG. 3B, in conjunction with FIGS. 1-2 and 4-6, in step 309, a determination is made by message analyzer 111 as to whether the proposed message (e.g., modified message 500) is modified by the user (author of message).

If the proposed message (e.g., modified message 500) is not modified by the user, then, in step 310, message analyzer 111 sends the message without modifications to the recipient.

If, however, the proposed message (e.g., modified message 500) was modified by the user (e.g., rejecting some of the recommended changes, editing the text), then, in step 311, message analyzer 111 sends the message with the user's modifications to the recipient.

By implementing the principles of the present invention as discussed above, the author is able to compose a message that sustains the recipient's interest in the message by modifying the message (e.g., changing the words and ordering of the words) to include language directed to the recipient's interests (e.g., traveling, collecting baseball cards, cars) and/or personality traits (e.g., hates loud music).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for adjusting text in a message to sustain recipient's interest in the message, the computer program product comprising a computer readable storage medium having program code embodied therewith, the program code comprising the programming instructions for:
   receiving a message for one or more recipients by a message analyzer connected to a network;
   identifying said one or more recipients to receive said message;
   retrieving, by said message analyzer, information regarding said identified one or more recipients from one or more company profile pages, one or more social media websites or a database, wherein said information comprises interests and/or personality traits of said identified one or more recipients;
   utilizing, by said message analyzer, a linguistic engine to generate words and phrases associated with an interest and/or personality trait of a first recipient of said identified one or more recipients, wherein said linguistic engine utilizes a database of words and/or phrases associated with interests and/or personality traits;
   utilizing natural language processing to change words and ordering of words in said message to include words and phrases associated with said interest and/or personality trait of said first recipient of said identified one or more recipients to generate a modified message;
   evaluating said modified message by generating a score based on proximity of said words and phrases associated with said interest and/or personality trait of said first recipient to negative and positive words;
   utilizing natural language processing to further change words and ordering of words in said modified message to include different words and phrases associated with said interest and/or personality trait of said first recipient so as to improve said score;
   displaying said modified message with words and phrases associated with said interest and/or personality trait of said first recipient to highlight recommended changes;
   receiving acceptances and/or rejections to said recommended changes from an author of said modified message; and
   sending said modified message to said first recipient after said author accepts and/or rejects said recommended changes thereby improving the technology in electronic communications by sustaining the recipient's interest in reading electronic messages.

2. The computer program product as recited in claim 1, wherein said one or more recipients to receive said message are identified based on keywords in said message.

3. The computer program product as recited in claim 1, wherein said one or more recipients to receive said message are identified based on users listed after the "TO" field in said message.

4. The computer program product as recited in claim 1, wherein said author informs said message analyzer regarding who are said one or more recipients to receive said message.

5. The computer program product as recited in claim 1, wherein said interests and/or personality traits of said identified one or more recipients are obtained from said one or more company profile pages using natural language processing.

6. The computer program product as recited in claim 1, wherein said recommended changes are shown in a proximity map format.

7. The computer program product as recited in claim 1, wherein said interests and/or personality traits of said identified one or more recipients are obtained from said one or more social media websites using natural language processing.

8. The computer program product as recited in claim 1, wherein said modification of said message comprises adjusting paragraph layouts/margins, scaling or moving paragraphs/sentences, and/or replacing parts of speech with a synonym which has a more positive or negative tone.

9. The computer program product as recited in claim 1, wherein said recommended changes are shown in a heat map format.

10. The computer program product as recited in claim 1, wherein the program code further comprises the programming instructions for:
    modifying said modified message in response to said author rejecting one or more of said recommended changes and/or in response to said author modifying text of said modified message.

11. A message analyzer, comprising:
    a memory for storing a computer program for adjusting text in a message to sustain recipient's interest in the message; and
    a processor coupled to the memory, wherein the processor is configured to execute the program instructions of the computer program comprising:
      receiving a message for one or more recipients by said message analyzer connected to a network;
      identifying said one or more recipients to receive said message;
      retrieving, by said message analyzer, information regarding said identified one or more recipients from one or more company profile pages, one or more social media websites or a database, wherein said information comprises interests and/or personality traits of said identified one or more recipients;
      utilizing, by said message analyzer, a linguistic engine to generate words and phrases associated with an interest and/or personality trait of a first recipient of said identified one or more recipients, wherein said linguistic engine utilizes a database of words and/or phrases associated with interests and/or personality traits;
      utilizing natural language processing to change words and ordering of words in said message to include words and phrases associated with said interest and/or personality trait of said first recipient of said identified one or more recipients to generate a modified message;
      evaluating said modified message by generating a score based on proximity of said words and phrases associated with said interest and/or personality trait of said first recipient to negative and positive words;

utilizing natural language processing to further change words and ordering of words in said modified message to include different words and phrases associated with said interest and/or personality trait of said first recipient so as to improve said score;

displaying said modified message with words and phrases associated with said interest and/or personality trait of said first recipient to highlight recommended changes;

receiving acceptances and/or rejections to said recommended changes from an author of said modified message; and sending said modified message to said first recipient after said author accepts and/or rejects said recommended changes thereby improving the technology in electronic communications by sustaining the recipient's interest in reading electronic messages.

12. The message analyzer as recited in claim 11, wherein said one or more recipients to receive said message are identified based on keywords in said message.

13. The message analyzer as recited in claim 11, wherein said one or more recipients to receive said message are identified based on users listed after the "TO" field in said message.

14. The message analyzer as recited in claim 11, wherein said author informs said message analyzer regarding who are said one or more recipients to receive said message.

15. The message analyzer as recited in claim 11, wherein said interests and/or personality traits of said identified one or more recipients are obtained from said one or more company profile pages using natural language processing.

16. The message analyzer as recited in claim 11, wherein said recommended changes are shown in a proximity map format.

17. The message analyzer as recited in claim 11, wherein said interests and/or personality traits of said identified one or more recipients are obtained from said one or more social media websites using natural language processing.

18. The message analyzer as recited in claim 11, wherein said modification of said message comprises adjusting paragraph layouts/margins, scaling or moving paragraphs/sentences, and/or replacing parts of speech with a synonym which has a more positive or negative tone.

19. The message analyzer as recited in claim 11, wherein said recommended changes are shown in a heat map format.

20. The message analyzer as recited in claim 11, wherein the program instructions of the computer program further comprise:

modifying said modified message in response to said author rejecting one or more of said recommended changes and/or in response to said author modifying text of said modified message.

* * * * *